United States Patent [19]
Chu

[11] Patent Number: 5,982,831
[45] Date of Patent: Nov. 9, 1999

[54] FEED FORWARD METHOD AND APPARATUS FOR GENERATING A CLOCK SIGNAL

[75] Inventor: David C. Chu, Woodside, Calif.

[73] Assignee: Hewlett-Packard Company, Palo Alto, Calif.

[21] Appl. No.: 08/604,273

[22] Filed: Feb. 21, 1996

[51] Int. Cl.[6] .................................................. H04L 7/00
[52] U.S. Cl. ...................... 375/371; 375/373; 370/516; 331/11
[58] Field of Search ....................................... 375/359, 371, 375/373, 375, 376; 370/516, 518; 331/1 R, 10, 11, 18, 25; 327/105, 236

[56] References Cited

U.S. PATENT DOCUMENTS

| | | |
|---|---|---|
| 3,544,717 | 12/1970 | Smith . |
| 4,563,657 | 1/1986 | Qureshi et al. .............................. 331/25 |
| 4,633,193 | 12/1986 | Scordo ...................................... 331/1 A |
| 4,849,993 | 7/1989 | Johnson et al. ........................... 375/357 |
| 4,947,382 | 8/1990 | Lesea ........................................ 368/118 |
| 5,473,274 | 12/1995 | Reilly et al. .............................. 327/159 |
| 5,533,072 | 7/1996 | Georgiou et al. ........................ 375/371 |
| 5,577,080 | 11/1996 | Sakaue et al. ........................... 376/376 |
| 5,610,953 | 3/1997 | Betts et al. .............................. 375/373 |
| 5,631,920 | 5/1997 | Hardin ..................................... 375/200 |
| 5,663,666 | 9/1997 | Chu et al. .................................. 327/7 |

*Primary Examiner*—Young T. Tse
*Attorney, Agent, or Firm*—John L. Imperato

[57] ABSTRACT

A feed forward apparatus and method discipline a clock signal by a reference signal in digital telecommunication networks. A synthesizer correction term within the feed forward apparatus and method includes a frequency correction term so that when one frequency correction term is selected in place of another frequency correction term the phase of the clock signal remains free from extraneous frequency or phase variations during the transition between frequency correction terms. Alternatively, the synthesizer correction term includes a phase correction term so that phase coherence between the reference signal and the clock signal results.

13 Claims, 3 Drawing Sheets

FEED FORWARD METHOD AND APPARATUS FOR GENERATING A CLOCK SIGNAL

FIELD OF THE INVENTION

The present invention relates to clock signals in digital telecommunication networks and, more particularly, to a method and apparatus for disciplining a clock signal by a reference signal.

BACKGROUND OF THE INVENTION

Information in digital telecommunication networks is transmitted and received at well-defined and precise bit rates, which are based on precise frequency sources. A node within the telecommunication network having direct access to these precise frequency sources may transmit information in the form of digital signals at very precise rates. However, many nodes do not have direct access to the precise frequency sources. These nodes recover an input clock from the incoming digital signal at the node. The recovered clock serves as a reference signal for disciplining an output clock signal. The disciplined output clock signal is subsequently used to synchronize transmission from the node. If one reference signal at a node becomes unusable, another reference signal, or reference, available at the node may be used in its place, providing robustness to the telecommunication network.

While the reference signals possess the excellent long-term frequency stability of the precise frequency source upon which the reference is based, the short-term frequency stability may be degraded as a result of transmission through the telecommunication network. At present, phase feedback servo loops are employed to reduce momentary degradations in frequency stability in an effort to generate a clock signal having both excellent long-term and short-term frequency stability.

An example of a feedback servo loop is the simple phase lock loop (PLL). In the simple PLL, an output signal produced by a frequency tunable oscillator is fed back for phase comparison to a reference input. The phase difference resulting from the phase comparison is processed and then used to tune the frequency of the oscillator such that the phase difference between the reference input and the output signal is nulled. In the steady state, or locked condition of the PLL, the reference input and the oscillator signal are phase aligned and are at the same frequency.

Other phase feedback servo loops are variations of the simple PLL. One example of such a phase feedback servo loop for disciplining an output (clock) signal by a reference input is taught by Scordo in U.S. Pat. No. 4,633,193. As in any phase feedback servo loop, the output signal is fed back within the loop. Iterative computation based on the present input and the past output signal produces a present output signal. Two oscillators are used. The first oscillator acts as a common phase reference for both the reference input and the output signal. The second oscillator is a tunable oscillator used to provide the output signal. A digital-to-analog converter produces an analog voltage for tuning the second oscillator based on the result of the iterative computation by integrators and summers.

Lesea in U.S. Pat. No. 4,947,382 teaches another method of disciplining a clock signal by a reference input based on phase feedback. Phase comparison takes place between the reference input and a synthesized output. The phase difference based on the phase comparison, is fed back to modify a synthesizer which produces the output signal. As with any feedback system, the output is used for its own synthesis.

In feedback servo loops, the output is fed back within the loop for comparison against a reference input to generate correction information, which is used to refine the output in an iterative manner. In telecommunication networks, in which there may be multiple reference inputs and only one output, the single output is dedicated to only one reference input for iteration, completing only one feedback loop. Thus, loops using other of the multiple reference inputs are incomplete. Switching from one reference to another requires completing an incomplete loop and bringing the newly completed loop to its final steady state. Loop transients generally result from such reference input switching.

Loop transients produce extraneous frequency and phase variations in the output (clock) signal which are not related to the reference inputs. Frequency and phase variations in the clock signal affect transmission to other nodes in the telecommunication network which sense the variations in the clock signal, and as a result, switch to another of the multiple references available at the node. The switching of that reference in turn, induces additional extraneous frequency and phase variations in its generated clock signal, and so on. The successive reference input switching and the loop transients that result, cause the overall performance of the telecommunication network to degrade.

SUMMARY OF THE INVENTION

In the present invention, a feed forward apparatus and method discipline a clock signal by a reference signal. The clock signal derives its long-term frequency stability from a reference signal and its short-term frequency stability from a local oscillator signal. A scaled phase detector compares the phase of the reference signal to a frequency scaled local oscillator signal and produces a phase deviation term. The phase deviation term is then processed to yield a synthesizer correction term. The local oscillator signal and the synthesizer correction term are then applied to a signal synthesizer to generate the clock signal.

In a first embodiment of the present invention, the synthesizer correction term comprises a frequency correction term. In the event that one frequency correction term available at the signal synthesizer is selected in place of another frequency correction term for generation of the clock signal, a small frequency step-transition generally occurs in the clock signal. However, the phase of the clock signal maintains its current value as the clock signal makes the transition from tracking the first frequency to tracking the second frequency. The clock signal remains free from extraneous frequency or phase variations throughout the frequency step-transition. This embodiment is especially applicable to telecommunication networks in which multiple reference signals are available at a node. In the event that the reference signal to which the selected frequency correction term corresponds, becomes unusable or otherwise undesirable, an alternate of the frequency correction terms, corresponding to an alternate of the reference signals, may be selected for use by the signal synthesizer in place of the initial frequency correction term. As one reference signal is chosen to discipline the clock signal in place of another reference signal at a node in the telecommunication network, the clock signal remains free of extraneous frequency and phase variations.

In a second embodiment of the present invention, the synthesizer correction term comprises a phase correction term. Complete phase coherence between the reference signal and the clock signal results. In the event that one phase correction term available at the signal synthesizer is selected in place of another phase correction term, the clock signal remains free of extraneous frequency or phase transients.

Multiple scaled phase detectors may also be used to generate multiple synthesizer correction terms from different references. Each synthesizer correction term corresponds to one of the multiple reference signals. The synthesizer correction terms are available at the signal synthesizer for generation of the clock signal. Selection of one of the synthesizer correction terms disciplines the clock signal by that reference signal corresponding to the selected synthesizer correction term. The time variation of the phase deviation terms corresponding to each reference signal may be analyzed to monitor the quality of the reference signals. If multiple reference signals are available, this analysis may be used to determine which one of the synthesizer correction terms is selected for use by the signal synthesizer to generate the clock signal.

DETAILED DESCRIPTION OF THE PREFERRED EMBODIMENT

Figure 1:
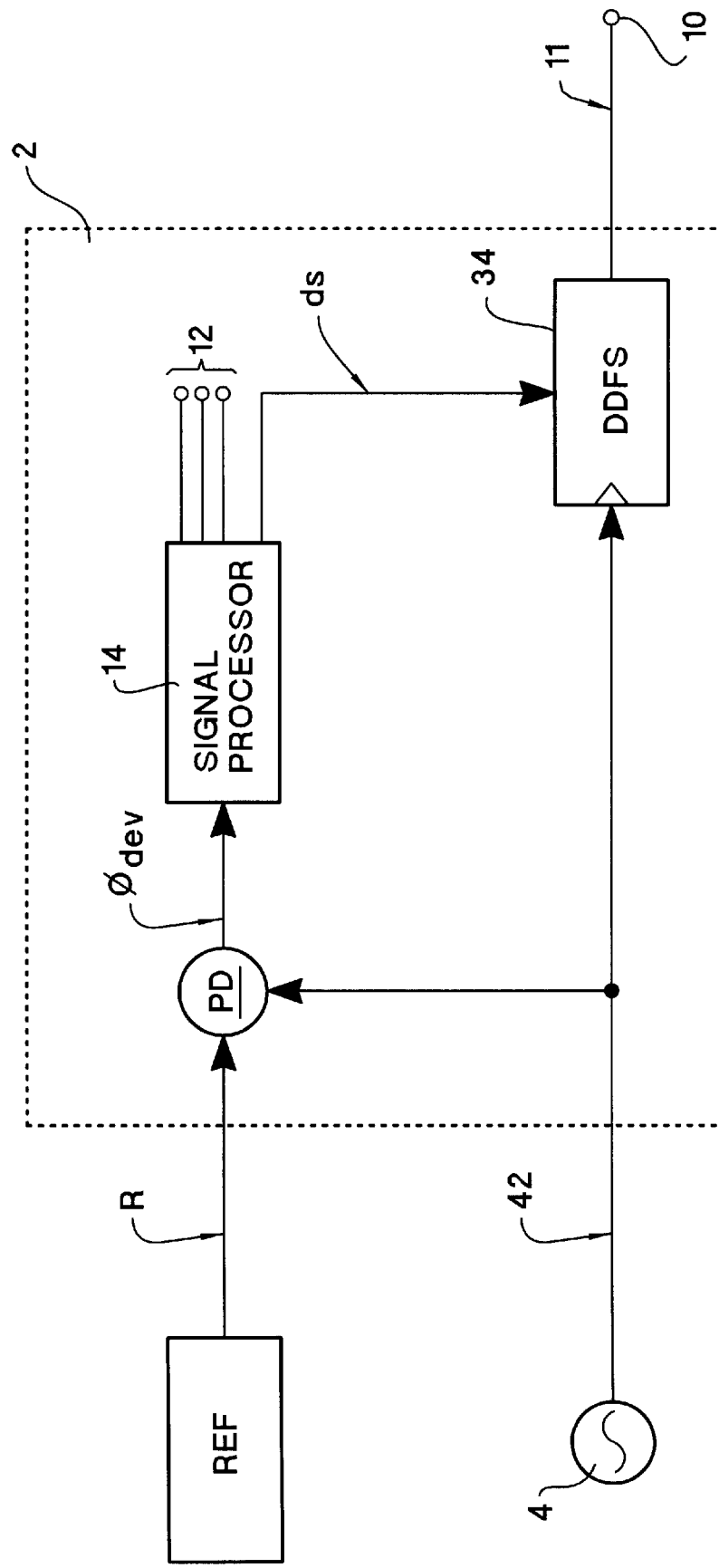
FIG. 1 shows a feed forward apparatus for disciplining a clock signal by a reference in the present invention.

FIG. 1 shows a feed forward apparatus 2 for disciplining a clock signal 11 by a reference signal R. The reference signal R and a local oscillator signal 42 are inputs to the apparatus 2. The reference signal R is supplied by a reference REF. In a telecommunication network the reference signal may have a nominal reference frequency $fr_{nom}$ to the incoming bit rate at a node in the network. Although the frequency of the reference signal R generally fluctuates about the nominal reference frequency $fr_{nom}$, the long-term frequency stability of the reference signal R, which may be based on Cesium or Hydrogen Maser, is significantly better than that of the local oscillator signal 42. However, the short-term frequency stability of the reference signal R may be degraded as a result of transmission through the network or as a result of live traffic modulation in the network.

A local oscillator 4 provides the local oscillator signal 42. The local oscillator 4 is typically a quartz or rubidium based oscillator, placed in temperature controlled oven to produce an oscillator signal 42 having a frequency stability on the order of several parts per $10^{10}$.

The clock signal 11 at the output of apparatus 2, has the short-term frequency stability present in the local oscillator signal 42 and the long-term frequency stability present in the reference signal R. Because the clock signal 11 derives its long term frequency stability from the reference signal R, it is said to be disciplined by the reference REF.

The reference signal R and the local oscillator signal 42 are applied to a scaled phase detector PD which produces a phase deviation term $\Phi_{dev}$, equal to the difference in phases between the reference signal R and the frequency scaled local oscillator signal 42 as scaled by the ratio of the nominal reference frequency $fr_{nom}$ to the nominal oscillator frequency $fx_{nom}$.

The phase deviation term $\Phi_{dev}$ is applied to a signal processor 14 which may filter, differentiate or otherwise process the phase deviation term $\Phi_{dev}$. The signal processor 14 may provide a number of outputs 12, some of which may be used to monitor the quality of the reference signal R and the oscillator signal 42, based on processing and analysis of the applied phase deviation term $\Phi_{dev}$. One output of the signal processor 14 derived from processing the phase deviation term $\Phi_{dev}$ is a synthesizer correction term ds.

The synthesizer correction term ds and the oscillator signal 42 are both applied to a signal synthesizer 34 which generates the clock signal 11 according to the applied inputs. The clock signal 11 has a nominal clock frequency $fc_{nom}$ attributed to the nominal oscillator frequency $fx_{nom}$ and a nominal synthesis ratio, or operand $R_{nom}$ of the signal synthesizer 34. The signal synthesizer 34 is triggered by the oscillator signal 42 and the nominal synthesis ratio $R_{nom}$ is modified according to the synthesizer correction term ds to generate the clock signal 11.

Figure 2:
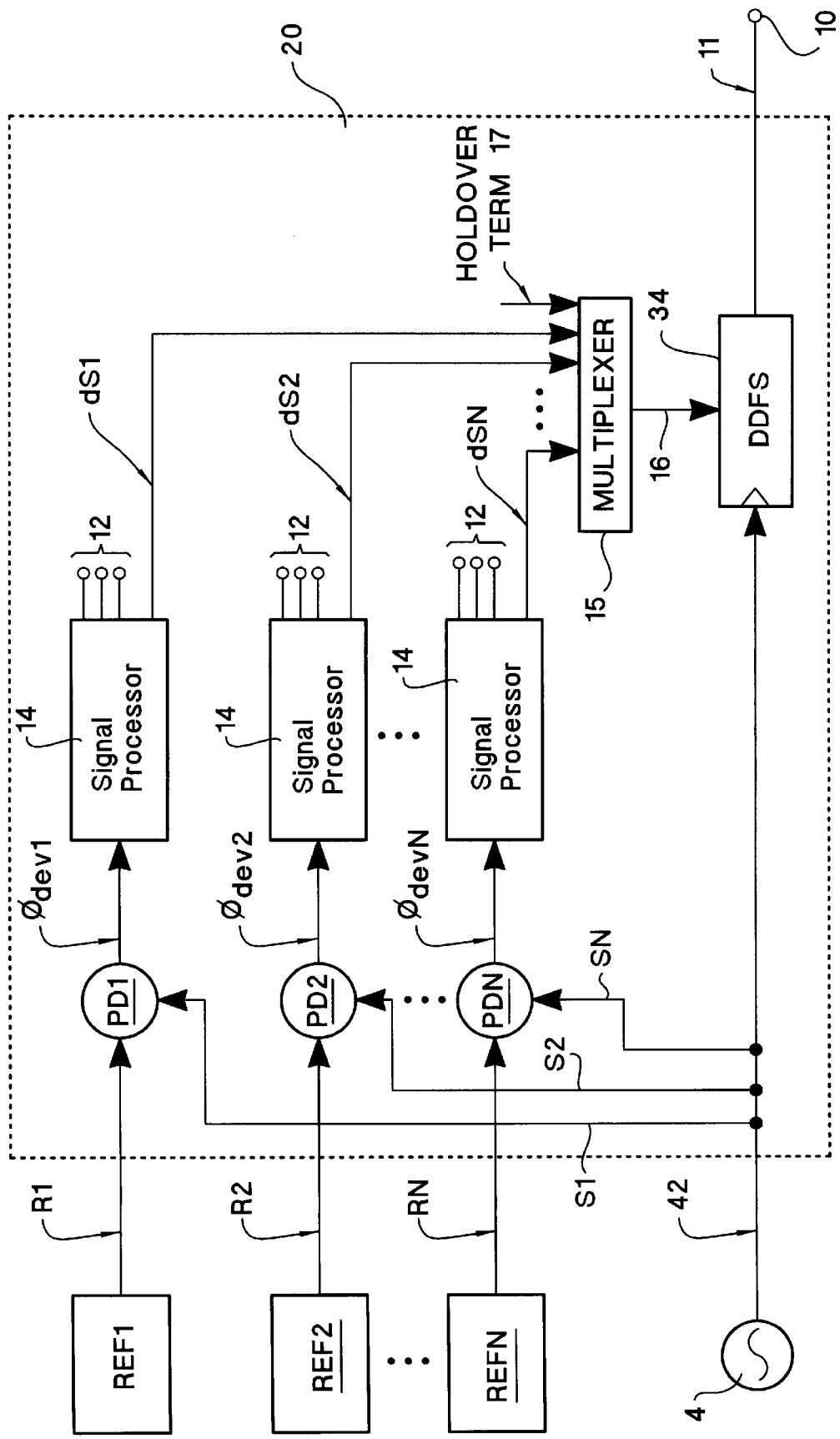
FIG. 2 shows a feed forward system for disciplining a clock signal by one of multiple references in the present invention.

A DDFS (direct digital frequency synthesizer) shown in FIG. 2 is used as the signal synthesizer 34. The DDFS is a 48-bit accumulator which is triggered by the local oscillator signal 42, that is, it performs an ADD (addition) function at every cycle of the local oscillator signal 42. The DDFS is an accumulator in the sense that its new summed output is the sum of an operand $R_{nom}$ and the previous summed output. The operand $R_{nom}$ is the ratio of the nominal clock frequency $fc_{nom}$ to the nominal oscillator frequency $fx_{nom}$. For example, if the nominal clock frequency $fc_{nom}$ equals 2.048 MHz and the nominal oscillator frequency $fx_{nom}$ is 10 MHz, then the nominal value of the operand $R_{nom}$ is equal to 0.2048 of the full 48-bit word. Discipline of the clock signal 11 is achieved by modifying the nominal value of the operand $R_{nom}$ by operand modifier DR. The nominal clock frequency $fc_{nom}$ can be chosen independently of the nominal reference frequency $fr_{nom}$ or the nominal oscillator frequency $fx_{nom}$. The overflow bit of the accumulator, once filtered, provides the clock signal 11.

In a first embodiment of the present invention, the synthesizer correction term ds comprises a frequency correction term df. The frequency correction term df is produced by the signal processor 14 as a result of processing the phase deviation term $\Phi_{dev}$. First, the signal processor 14 digitally lowpass filters the phase deviation term $\Phi_{dev}$ to reduce noise and other short-term fluctuations. Then the rate of change of the filtered phase deviation term $\Phi_{dev}$ is computed to yield the frequency correction term df (in hertz). The operand modifier DR is calculated using the frequency correction term df according to the formula:

$$DR = (df \cdot fc_{nom})/(fr_{nom} \cdot fx_{nom})$$

where $fr_{nom}$ is the nominal reference frequency and $fx_{nom}$ is the nominal oscillator frequency, as previously described. The operand modifier DR is added to the operand $R_{nom}$ and remains operative for each addition triggered by each cycle of the local oscillator signal, changing only at a predetermined correction rate. For example, if the correction rate is 1 Hz, i.e., 1 per second, then the operand modifier DR is added to the operand $R_{nom}$ for the duration of 1 second. During that time, the accumulator will have been triggered 10 million times (for the nominal oscillator frequency $fx_{nom}$ equal to 10 MHz).

In a second embodiment of the present invention, the synthesizer correction term ds comprises a phase correction term dp. The phase correction term dp is produced by the signal processor 14 as a result of processing the phase deviation term $\Phi_{dev}$. First, the signal processor 14 digitally lowpass filters the phase deviation term $\Phi_{dev}$ to reduce noise and other short-term fluctuations. Then, the change in values between filtered phase deviation terms $\Phi_{dev}$ from the corresponding reference, at the correction rate, is computed to yield the phase correction term dp. The operand modifier is then calculated using the phase deviation term dp, according to the formula:

$$DR = dp * fc_{nom}/fr_{nom}$$

where $fc_{nom}$ is the nominal clock frequency and $fr_{nom}$ is the nominal reference frequency. The operand modifier DR is added to the operand $R_{nom}$ for only a single cycle of the local oscillator signal 42.

FIG. 2 shows a feed forward system 20 for disciplining a clock signal 11 by one of multiple references Ref1, Ref2 . . . RefN. The feed forward system 20 is based on the feed forward apparatus of FIG. 1. The feed forward system 20 produces a clock signal 11 having the short-term frequency stability present in the local oscillator signal 42 and the long-term frequency stability present in the particular reference Ref1, Ref2 . . . RefN used to discipline the clock signal 11. In the event that a particular reference, for example Ref1, becomes unusable, the clock signal 11 may be disciplined by one of the remaining references, for example, Ref2 through RefN. As one reference is used in place of another reference, the clock signal 11 at the output 10 remains phase continuous and free from extraneous frequency and phase variations.

The local oscillator signal 42 is distributed into multiple signal paths S1, S2 . . . SN. Each reference Ref1, Ref2 . . . RefN produces a corresponding reference signal R1, R2 . . . RN. Multiple scaled phase detectors PD1, PD2 . . . PDN are used, each providing a phase deviation term $\Phi_{dev}1$, $\Phi_{dev}2$ . . . $\Phi_{dev}N$ equal to the phase difference between a corresponding reference signal R1, R2 . . . RN and the local oscillator signal 42 appropriately scaled in frequency. Each scaled phase detector PD1, PD2 . . . PDN scales the frequency of the local oscillator signal 42 by the ratio of the nominal reference frequency $fr1_{nom}$, $fr2_{nom}$ . . . $frN_{nom}$ of the applied reference signal R1, R2 . . . RN to the nominal oscillator frequency. For example, scaled phase detector PD1 scales nominal oscillator frequency $fx_{nom}$ by the ratio of the nominal reference frequency $fr1_{nom}$ to the nominal oscillator frequency $fx_{nom}$. Signal processors 14 produce synthesizer correction terms ds1, ds2 . . . dsN from each of the phase deviation terms $\Phi_{dev}1$, $\Phi_{dev}2$ . . . $\Phi_{dev}N$.

The synthesizer correction terms ds1, ds2 . . . dsN are then applied simultaneously to the input of a programmable multiplexer 15. The output 16 of programmable multiplexer 15, which is one of the synthesizer correction terms ds1, ds2 . . . dsN, is applied to the signal synthesizer 34 which comprises a DDFS. As previously described, the DDFS generates the clock signal 11 according to the applied oscillator signal 42 and the synthesizer correction term ds applied to the DDFS from the output of multiplexer 15. The nominal synthesis ratio $R_{nom}$ of the signal synthesizer 34 is then modified according to the one of the synthesizer correction terms ds1, ds2 . . . dsN that is selected at the output 16 of programmable multiplexer 15.

Each of the synthesizer correction terms ds1, ds2 . . . dsN are available for use by the signal synthesizer 34 to generate the clock signal 11, and one of the synthesizer correction terms ds1, ds2 . . . dsN may be selected in place of another of the synthesizer correction terms using programmable multiplexer 15.

Parameters indicative of the quality of each of the reference signals R1, R2 . . . RN and the local oscillator signal 42 are provided at outputs 12 of signal processor 14. In addition to the synthesizer correction terms ds1, ds2 . . . dsN, parameters derived from the phase deviation terms $\Phi_{dev}1$, $\Phi_{dev}2$ . . . $\Phi_{dev}N$, may include Maximum Time Interval Error (MTIE), Time Deviation (TDEV) and Time Variance (TVAR). As a result of analysis of the parameters, a reference may be deemed unusable based on predetermined criterion for reference signal quality. In the event that a reference is deemed unusable, a synthesizer correction term corresponding to an alternate reference may then be selected using programmable multiplexer 15 used to derive the clock signal 11. In telecommunication networks a clock signal 11 free from extraneous frequency and phase variations is relied upon for synchronizing data transmission from a variety of nodes. As one of the frequency correction terms, for example df2, is selected in place of the currently used frequency correction term, for example df1, there is generally a transition in the frequency of the clock signal 11. However, the phase of the clock signal, which is the integral of the frequency of the clock signal, adjusts only to accommodate the frequency transition, but remains free from extraneous frequency and phase variations, as alternate frequency correction terms df2 . . . dfN, corresponding to alternate references Ref2 . . . RefN, are selected using programmable multiplexer 15.

In the event that none of the multiple references Ref1, Ref2 . . . RefN available at a node are deemed unusable, a holdover frequency correction term, or holdover term 17, may be applied to signal synthesizer 34 to maintain the clock signal 11 at output 10. The holdover term 17, applied to multiplexer 15, may be based on the extrapolation of the values of the previously applied frequency correction term. For example, if the frequency correction term at the output 16 of multiplexer 15 were previously used by the signal synthesizer 34, and the frequency correction term had a particular profile versus time, the holdover term 17 would take on the last used value of the frequency correction term. Future values of the holdover term 17 would be based on a curve-fit to the profile of the previously applied frequency correction term.

The feed forward apparatus 2 and the feed forward system 20, as shown, are implemented using digital hardware. The scaled phase detectors are digital, the signal processor 14 may comprise digital filters and differentiators, and the signal synthesizer is a direct digital frequency synthesizer. Many of these functional elements may also have analog equivalents. Any signal synthesizer, such as a direct digital synthesizer, based on the local oscillator signal 42 and disciplined by the synthesizer correction term ds1, ds2 . . . dsN may be used in the generation of clock signal 11.

Alternatively, many of the functional elements of feed forward apparatus 2 and feed forward system 20 may be implementable using software. The signal processors 14, multiplexer 15, and computation of the holdover term 17 shown in FIG. 2 may be implemented collectively by a single microprocessor.

Various combinations of digital hardware, analog hardware and software may be used to implement the functional equivalents of the scaled phase detectors PD1, PD2 . . . PDN, signal processor 14 and signal synthesizer 34 shown in FIG. 2 for generation of the phase continuous clock signal. The choice of implementation of the functional blocks may be based on system performance requirements, cost, physical size constraints and availability of components. However, the method of generating the disciplined clock signal is independent of the hardware or software details used in the implementation of the functional blocks of the feed forward apparatus 2 and feed forward system 20.

Figure 3:
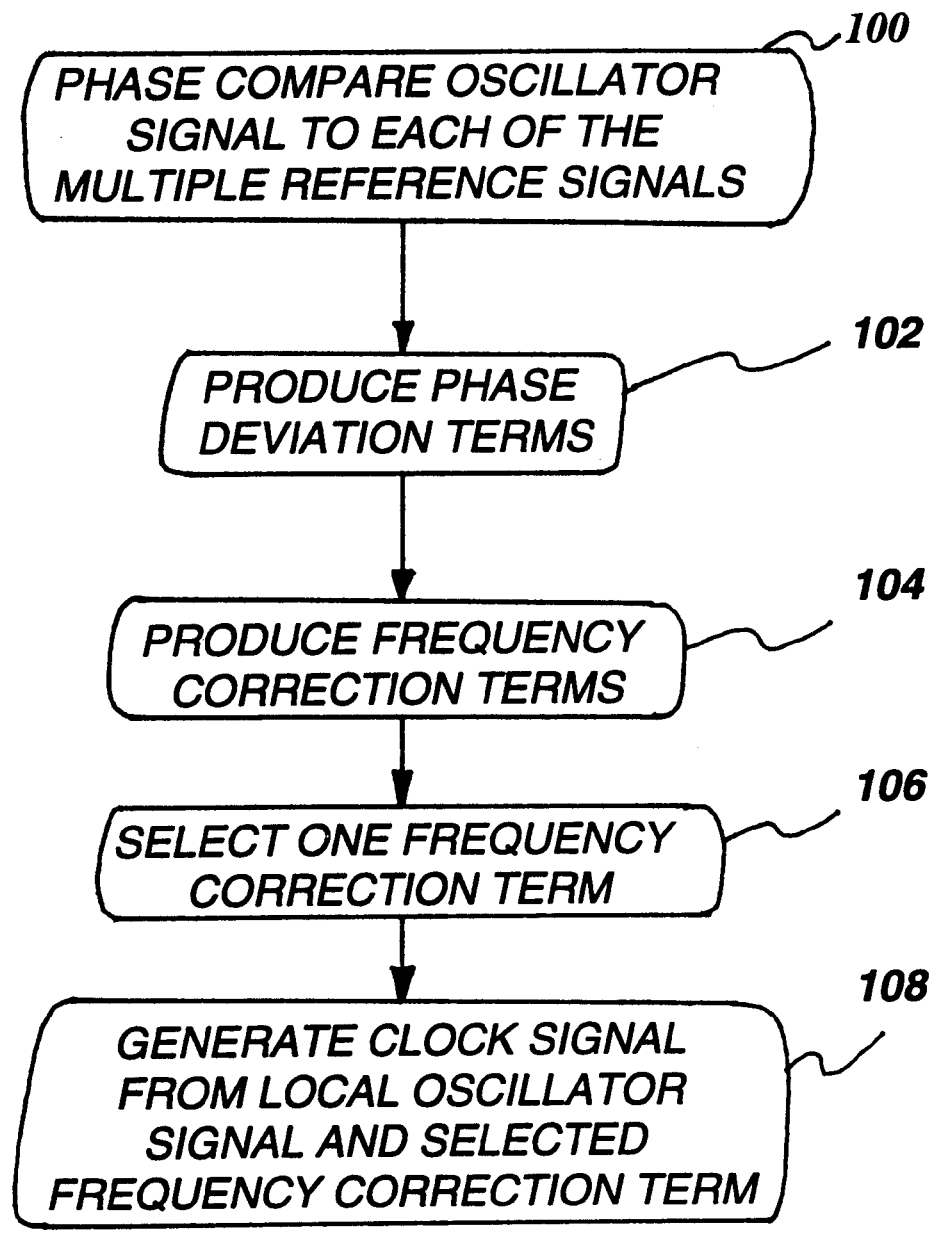
FIG. 3 shows a method of the present invention for disciplining a clock signal.

FIG. 3 illustrates a method used to discipline clock signal by one of multiple reference signals and a local oscillator signal, independent of hardware and software used. In step 100 the local oscillator signal is simultaneously phase compared to each of the multiple reference signals. Appropriate frequency scaling of the local oscillator signal prior to each phase comparison may be incorporated to assure a predetermined frequency relationship between the local oscillator signal and each of the multiple reference signals. In step 102, a phase deviation term is produced from each of the phase comparisons. Lowpass filtering or other types of filtering may be applied to the phase deviation term to suppress noise, spurs or other undesired signals that may negatively effect the clock signal.

In step 104, multiple synthesizer correction terms, comprising frequency correction term are produced, each frequency correction term based on the rate of change of each of the phase deviation terms. In step 106, one of the multiple frequency correction terms is selected. In step 108, a clock signal is synthesized from the local oscillator signal and is modified by the selection. The frequency of the clock signal corresponds to the particular frequency correction term selected. When a different frequency correction term is selected, the frequency of the clock signal then corresponds to the newly selected frequency correction term. However, the phase of the clock signal is continuous, free from extraneous frequency and phase variations as another of the multiple frequency correction terms is selected.

Parameters indicative of the quality of each of the multiple references, such as MTIE, TVAR or TDEV may be used to determine the selection in step 106.

What is claimed is:

1. An apparatus for disciplining a clock signal having a nominal clock frequency, by a pair of reference signals each having a nominal reference frequency, the apparatus using a local oscillator signal having a nominal oscillator frequency, the apparatus comprising:

a first scaled phase detector receiving the local oscillator signal and receiving the first reference signal of the pair of reference signals, the first scaled phase detector producing a first phase deviation term equal to the difference between the phase of the first reference signal and the phase of the local oscillator signal as scaled in frequency by the ratio of the nominal reference frequency of the first reference signal to the nominal oscillator frequency;

a first signal processor, receiving the first phase deviation term and producing a first synthesizer correction term;

a second scaled phase detector receiving the local oscillator signal and receiving the second reference signal of the pair of reference signals, the second scaled phase detector producing a second phase deviation term equal to the difference between the phase of the second reference signal and the phase of the scaled local oscillator signal as scaled in frequency by the ratio of the nominal reference frequency of the second reference signal to the nominal oscillator frequency;

a second signal processor, receiving the second phase deviation term and producing a second synthesizer correction term; and a signal synthesizer, receiving the local oscillator signal and receiving one of the first and the second synthesizer correction terms, the signal synthesizer having a nominal synthesis ratio equal to the ratio of the nominal clock frequency to the nominal oscillator frequency, the nominal synthesis ratio modified by the received synthesis correction terms to produce the disciplined clock signal at a first frequency when the first synthesizer correction term is applied and producing the disciplined clock signal at a second frequency when the second synthesizer correction term is applied.

2. The apparatus of claim 1 the first signal processor including a lowpass filter for filtering the first phase deviation term to produce the first synthesizer correction term comprising a first phase correction term and the second signal processor including a lowpass filter for filtering the second phase deviation term to produce the second synthesizer correction term comprising a second phase correction term.

3. The apparatus of claim 2, the signal synthesizer comprising a direct digital frequency synthesizer triggered by the local oscillator signal, the first signal processor scaling the first phase correction term by the ratio of the nominal clock frequency to the nominal reference frequency of the first reference signal, and the second signal processor scaling the second phase correction term by the ratio of the nominal clock frequency to the nominal reference frequency of the second reference signal, the direct digital frequency synthesizer adding one of the first and second scaled phase correction terms to the nominal synthesis ratio during one trigger of the direct digital frequency synthesizer by the local oscillator signal.

4. The apparatus of claim 1 wherein the nominal synthesis ratio is modified by a holdover term to produce the disciplined clock signal.

5. The apparatus of claim 1, the first signal processor including a lowpass filter for filtering the first phase deviation term to produce the first synthesizer correction term comprising a first frequency correction term based on the rate of change of the filtered first phase deviation term, and the second signal processor including a lowpass filter for filtering the second phase deviation term to produce the second synthesizer correction term comprising a second frequency correction term based on the rate of change of the filtered second phase deviation term.

6. The apparatus of claim 5, the signal synthesizer comprising a direct digital frequency synthesizer triggered by the local oscillator signal, and the first signal processor scaling the first frequency correction term by the ratio of the nominal clock frequency to the product of the nominal reference frequency of the first reference signal and the nominal oscillator frequency, the scaled first frequency correction term added to the nominal synthesis ratio during multiple triggers of the direct digital frequency synthesizer by the local oscillator signal when the scaled first frequency correction term is applied to the direct digital frequency synthesizer, and the second signal processor scaling the second frequency correction term by the ratio of the nominal clock frequency to the product of the nominal reference frequency of the second reference signal and the nominal oscillator frequency, the scaled second frequency correction term added to the nominal synthesis ratio during multiple triggers of the direct digital frequency synthesizer by the local oscillator signal when the scaled second frequency correction term is applied to the direct digital frequency synthesizer.

7. The apparatus of claim 5, the first signal processor also providing a first parameter for monitoring the quality of the first reference signal of the pair of reference signals and the second signal processor also providing a second parameter for monitoring the quality of the second reference signal of the pair of reference signals.

8. The apparatus of claim 7, wherein the first and second parameters are used to determine when the first frequency correction signal is applied to the signal synthesizer and when the second frequency correction signal is applied to the signal synthesizer.

9. A method for disciplining a clock signal at a nominal clock frequency by a pair of reference signals each having a nominal reference frequency and a local oscillator signal having a nominal oscillator frequency, the method comprising the steps of:

scaling the nominal oscillator frequency by the ratio of the nominal reference frequency of the first reference signal to the nominal oscillator frequency;

comparing a phase of the first reference signal of the pair of reference signals to a phase of the scaled nominal oscillator frequency;

producing a first phase deviation term based on the comparison;

filtering the first phase deviation term;

producing a first frequency correction term based on the rate of change of the filtered first phase deviation term;

scaling the nominal oscillator frequency by the ratio of the nominal reference frequency of the second reference signal to the nominal oscillator frequency;

comparing a phase of the second reference signal of the pair of reference signals to the phase of the scaled nominal oscillator frequency;

producing a second phase deviation term based on the comparison;

filtering the second phase deviation term;

producing a second frequency correction term based on the rate of change of the filtered second phase deviation term;

selecting one of the first frequency correction term and the second frequency correction term; and generating the disciplined clock signal based on the selection, the clock signal having a first frequency when the first frequency correction term is selected and having a second frequency when the second frequency correction term is selected.

10. The method of claim 9, the step of generating the disciplined clock signal further including the step of modifying a nominal synthesis ratio according to the first frequency correction term when the first frequency correction term is selected and further including the step of modifying a nominal synthesis ratio according to the second frequency correction term when the second frequency correction term is selected.

11. The method of claim 10, the step of modifying the nominal synthesis ratio according to the first frequency correction term includes adding to the nominal synthesis ratio the first frequency correction term scaled by the ratio of the nominal clock frequency to the product of the nominal reference frequency of the first reference signal and the nominal oscillator frequency, and the step of modifying the nominal synthesis ratio according to the second frequency correction term includes adding to the nominal synthesis ratio the second frequency correction term scaled by the ratio of the nominal clock frequency to the product of the nominal reference frequency of the second reference signal and the nominal oscillator frequency.

12. The method of claim 9, further comprising the steps of producing a first parameter for monitoring the quality of the first reference signal, and producing a second parameter for monitoring the quality of the second reference signal.

13. The method of claim 12 wherein the step of selecting one of the first frequency correction term and the second frequency correction term is based on the first parameter and the second parameter.

* * * * *